United States Patent
Rafalowski et al.

(10) Patent No.: US 11,653,078 B2
(45) Date of Patent: May 16, 2023

(54) OPTICAL DEVICE WITH A FLEXIBLE HEATING ELEMENT

(71) Applicant: Aptiv Technologies Limited, St. Michael (BB)

(72) Inventors: Arkadiusz Rafalowski, Brzezinka (PL); Witold Poreda, Ruciane Nida (PL)

(73) Assignee: Aptiv Technologies Limited, St. Michael (BB)

( * ) Notice: Subject to any disclaimer, the term of this patent is extended or adjusted under 35 U.S.C. 154(b) by 752 days.

(21) Appl. No.: 16/442,623

(22) Filed: Jun. 17, 2019

(65) Prior Publication Data
US 2019/0381939 A1 Dec. 19, 2019

(30) Foreign Application Priority Data
Jun. 18, 2018 (FR) ...................................... 1855337

(51) Int. Cl.
*H04N 23/55* (2023.01)
*B60R 1/06* (2006.01)
(Continued)

(52) U.S. Cl.
CPC ........... *H04N 23/55* (2023.01); *B60R 1/0602* (2013.01); *G02B 7/028* (2013.01);
(Continued)

(58) Field of Classification Search
CPC .......... H05K 1/189; H05K 1/028; H05K 1/18; H04N 5/2254; H04N 5/2253;
(Continued)

(56) References Cited

U.S. PATENT DOCUMENTS 9,937,876 B2 * 4/2018 Bingle ................ H04N 5/2253
9,961,722 B2   5/2018 Chae et al.
(Continued)

FOREIGN PATENT DOCUMENTS

CN    104995906 A    10/2015
CN    106560742      4/2017
(Continued)

OTHER PUBLICATIONS

"Extended European Search Report", EP Application No. 19181023.3, dated Nov. 12, 2019, 8 pages.
(Continued)

*Primary Examiner* — Jennifer D Bennett
*Assistant Examiner* — Erin R Garber
(74) *Attorney, Agent, or Firm* — Sawtooth Patent Group PLLC (57) ABSTRACT

An optical device comprises at least one printed circuit board, the printed circuit board includes an electronic image-capture circuit, a lens holder comprising at least one optical lens, the lens holder comprising a wall forming a cavity extending along the optical axis of the device from its top end to its bottom end, the bottom end being mounted on the rigid printed circuit board so as to align, along the optical axis of the device, the electronic image-capture circuit and the optical lens, a flexible heater band arranged in contact with the wall of the lens holder and around the wall of the lens holder, the heater band comprising an electrical connection interface electrically connected to at least one rigid printed circuit board of the optical device.

20 Claims, 5 Drawing Sheets

(51) Int. Cl.
    *G02B 7/02*         (2021.01)
    *G02B 27/00*      (2006.01)
    *G03B 17/55*      (2021.01)
    *H04N 23/54*     (2023.01)
    *H04N 23/52*     (2023.01)
    *H01R 12/62*     (2011.01)

(52) U.S. Cl.
    CPC ......... *G02B 27/0006* (2013.01); *G03B 17/55* (2013.01); *H01R 12/62* (2013.01); *H04N 23/52* (2023.01); *H04N 23/54* (2023.01)

(58) Field of Classification Search
    CPC ............. H04N 5/22521; H04N 5/2252; H04N 5/2251; G02B 7/028; G02B 27/0006; G02B 23/2476; G02B 3/0031; G03B 17/55; G03B 17/12; H01R 12/62; H01R 2201/26; H05B 3/02; H05B 3/00
    See application file for complete search history.

(56) References Cited

U.S. PATENT DOCUMENTS

| | | | |
|---|---|---|---|
| 10,279,781 B2 | 5/2019 | Zurowski et al. | |
| 2004/0136090 A1 | 7/2004 | Iikawa et al. | |
| 2012/0170119 A1 | 7/2012 | Chu et al. | |
| 2013/0270441 A1 | 10/2013 | Burt et al. | |
| 2015/0092363 A1* | 4/2015 | Blier ..................... | G02B 6/00 361/749 |
| 2016/0358849 A1* | 12/2016 | Jur ......................... | H01L 27/16 |
| 2017/0099700 A1 | 4/2017 | Chae et al. | |
| 2017/0129418 A1 | 5/2017 | Koshiba et al. | |
| 2017/0215718 A1* | 8/2017 | Schan ................... | A61B 1/127 |
| 2018/0176431 A1 | 6/2018 | Kim et al. | |
| 2018/0243804 A1 | 8/2018 | Magee et al. | |
| 2018/0345911 A1 | 12/2018 | Rowski et al. | |
| 2019/0381939 A1 | 12/2019 | Rafalowski et al. | |
| 2019/0384055 A1 | 12/2019 | Rafalowski et al. | |

FOREIGN PATENT DOCUMENTS

| | | | | |
|---|---|---|---|---|
| CN | 106973202 | | 7/2017 | |
| CN | 106973202 A | * | 7/2017 | ........... H04N 5/2251 |
| CN | 107333045 | | 11/2017 | |
| CN | 107690594 | | 2/2018 | |
| CN | 107690594 A | * | 2/2018 | ............... B60R 1/08 |
| CN | 207039747 | | 2/2018 | |
| CN | 207184639 | | 4/2018 | |
| CN | 207216107 | | 4/2018 | |
| CN | 207438964 | | 6/2018 | |
| CN | 105791642 | | 4/2020 | |
| CN | 107733726 | | 6/2021 | |
| EP | 3153922 | | 4/2017 | |
| EP | 3410199 | | 12/2018 | |
| KR | 20080105396 A | * | 12/2008 | ............ G03B 17/12 |
| KR | 101064666 B1 | * | 9/2011 | |
| KR | 101064666 B1 | | 9/2011 | |
| WO | 2016160237 A1 | | 10/2016 | |
| WO | 2016195403 | | 12/2016 | |
| WO | 2017208981 | | 12/2017 | |
| WO | 2018020129 A1 | | 2/2018 | |
| WO | 2018/052043 A1 | | 3/2018 | |

OTHER PUBLICATIONS

"Extended European Search Report", EP Application No. 19180952.4, dated Nov. 14, 2019, 9 pages.

"Foreign Office Action", CN Application No. 201910521543.0, dated Sep. 11, 2020, 15 pages.

"Foreign Office Action", CN Application No. 201910521544.5, dated Mar. 3, 2021, 10 pages.

"Foreign Office Action", CN Application No. 201910521544.5, dated Aug. 12, 2021, 28 pages.

"Foreign Office Action", EP Application No. 19181023.3, dated Mar. 14, 2022, 6 pages.

* cited by examiner

OPTICAL DEVICE WITH A FLEXIBLE HEATING ELEMENT

CROSS-REFERENCE TO RELATED APPLICATION

This application claims the benefit under 35 U.S.C. § 119(a) of French Patent Application FR1855337, filed Jun. 18, 2018, the entire disclosure of which is hereby incorporated herein by reference.

TECHNICAL FIELD

This disclosure generally relates to an optical device for a vehicle and more particularly to an optical device comprising a heating element.

BACKGROUND

Electronic members for a motor vehicle that are arranged on the exterior of the vehicles must be subject to environmental constraints such as cold and ice. In order not to suffer the persistent effects of these constraints, these electronic members are generally equipped with electrical devices allowing to get rid of the effects of these constraints. For example, electronic members equipped with electrical devices can be found such as for example heating elements for fighting frost.

These electrical devices are generally piloted by means of wiring harnesses and connectors connecting an electronic control board and the electrical devices.

Current solutions for electrical connection of these electrical devices are bulky, expensive and heavy.

SUMMARY

An optical device comprises a rigid printed circuit board including an electronic image-capture circuit; a lens holder comprising at least one optical lens, the lens holder comprising a wall forming a cavity extending along the optical axis of the device from its top end to its bottom end, the bottom end being mounted on the rigid main portion of the printed circuit board so as to align, along the optical axis of the device, the electronic image-capture circuit and the optical lens; the optical device further comprises a flexible heater band arranged in contact with the wall of the lens holder and around the wall of the lens holder, the heater band comprising an electrical connection means electrically connected to at least one rigid printed circuit board of the optical device.

The electrical connection means may be electrically connected to the rigid printed circuit board including the electronic image-capture circuit. The two longitudinal ends of the heater band comprise attachment means that can clamp the heater band against the wall of the lens holder. The attachment means may comprise an elastic portion so as to fit to the profile of the wall of the lens holder.

The heater band comprises electrical conductors configured to be traversed by an electric current coming from the printed circuit board.

The heater band may be formed by a flexible-type printed circuit board. The electrical connection means may be a connection of the flexible printed circuit board type, in substrate continuity with the heater band. The electrical connection means may comprise a thinned portion of the substrate of the rigid printed circuit board.

According to the invention, a method for assembling an optical device includes the following steps: providing a lens holder including at least one optical lens and comprising a wall forming a cavity extending along the optical axis of the device; providing a rigid printed circuit board comprising an electronic image-capture component; arranging the rigid printed circuit board on the lens holder so as to be able to align, along the optical axis of the device, the electronic image-capture circuit and the optical lens; providing a flexible heater band including an electrical connection means and attachment means; electrically connecting the electrical connection means to the rigid printed circuit board; arranging the heater band around the wall of the lens holder; and holding the heater band against the wall of the lens holder via the attachment means of the heater band.

The step of providing the rigid printed circuit board, the step of providing the heater band and the step of electrically connecting the electrical connection means to the rigid printed circuit board may be substituted by a single step of providing a single printed circuit board comprising a rigid main printed circuit board including the electronic image-capture component, and comprising a flexible printed circuit board including the flexible heater band and including an extension forming the electrical connection means, said flexible printed circuit board being in substrate continuity of the rigid main part.

Other objects and advantages of the present invention will become apparent from the following description. Further features and advantages will appear more clearly on a reading of the following detailed description of the preferred embodiment, which is given by way of non-limiting example only and with reference to the accompanying drawings.

BRIEF DESCRIPTION OF DRAWINGS

Other characteristics, objects and advantages of the invention will become apparent upon reading the following detailed description, and with reference to the appended drawings, given by way of non-limiting example and in which.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

'One or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for describing embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

In order to facilitate the description, and not exclusively, an orthogonal reference frame comprising a longitudinal axis L, a transverse axis T and a vertical axis V is defined. "Bottom", "top", "above", "below", "lower" and "upper" orientations are defined along the vertical direction. "Left", "right" and "lateral" orientations are defined according to the transverse direction. "Front" and "rear" orientations are also defined along the longitudinal direction.

Figure 1:
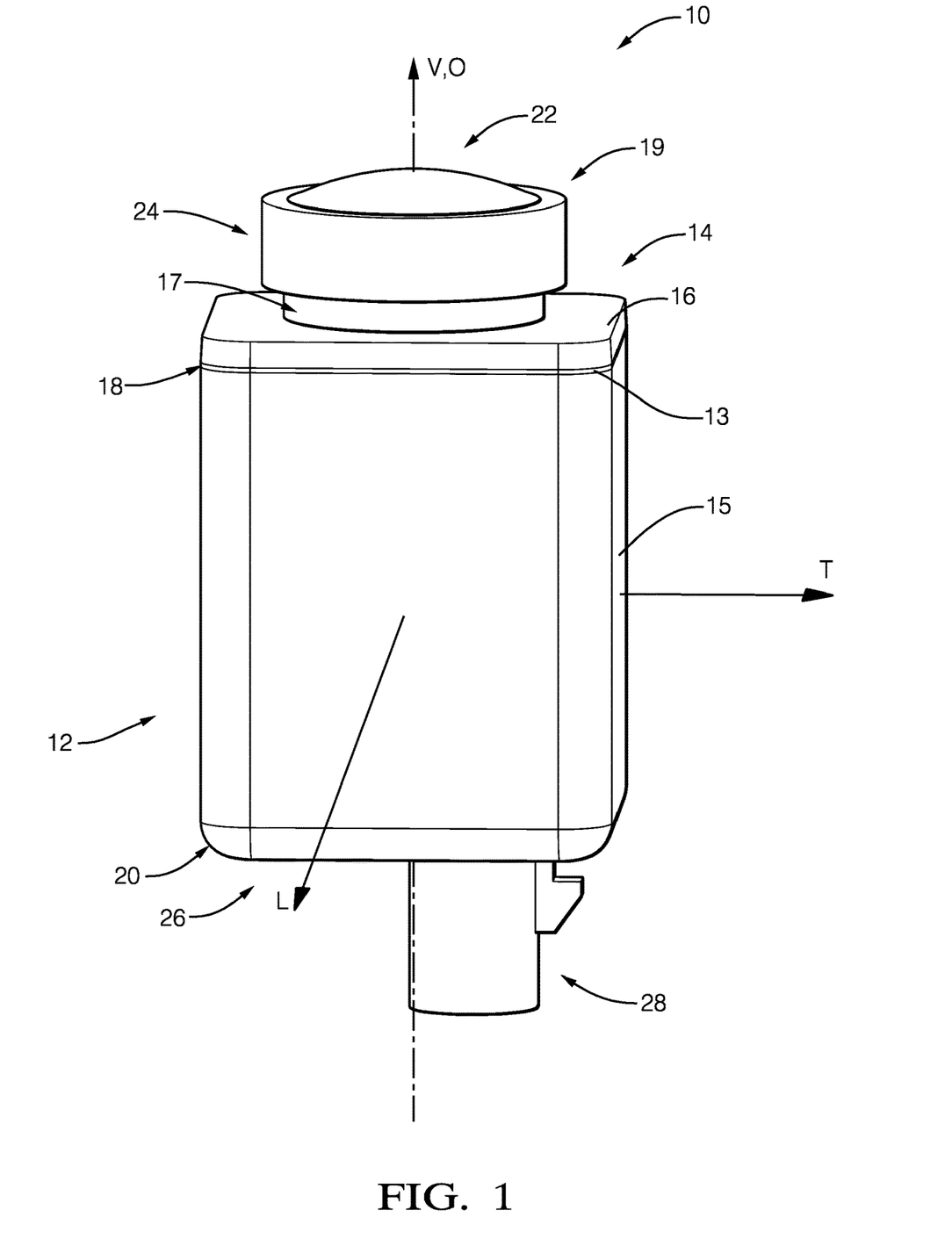
FIG. 1 is a schematic perspective view of the optical device according to the invention.
Figure 2:
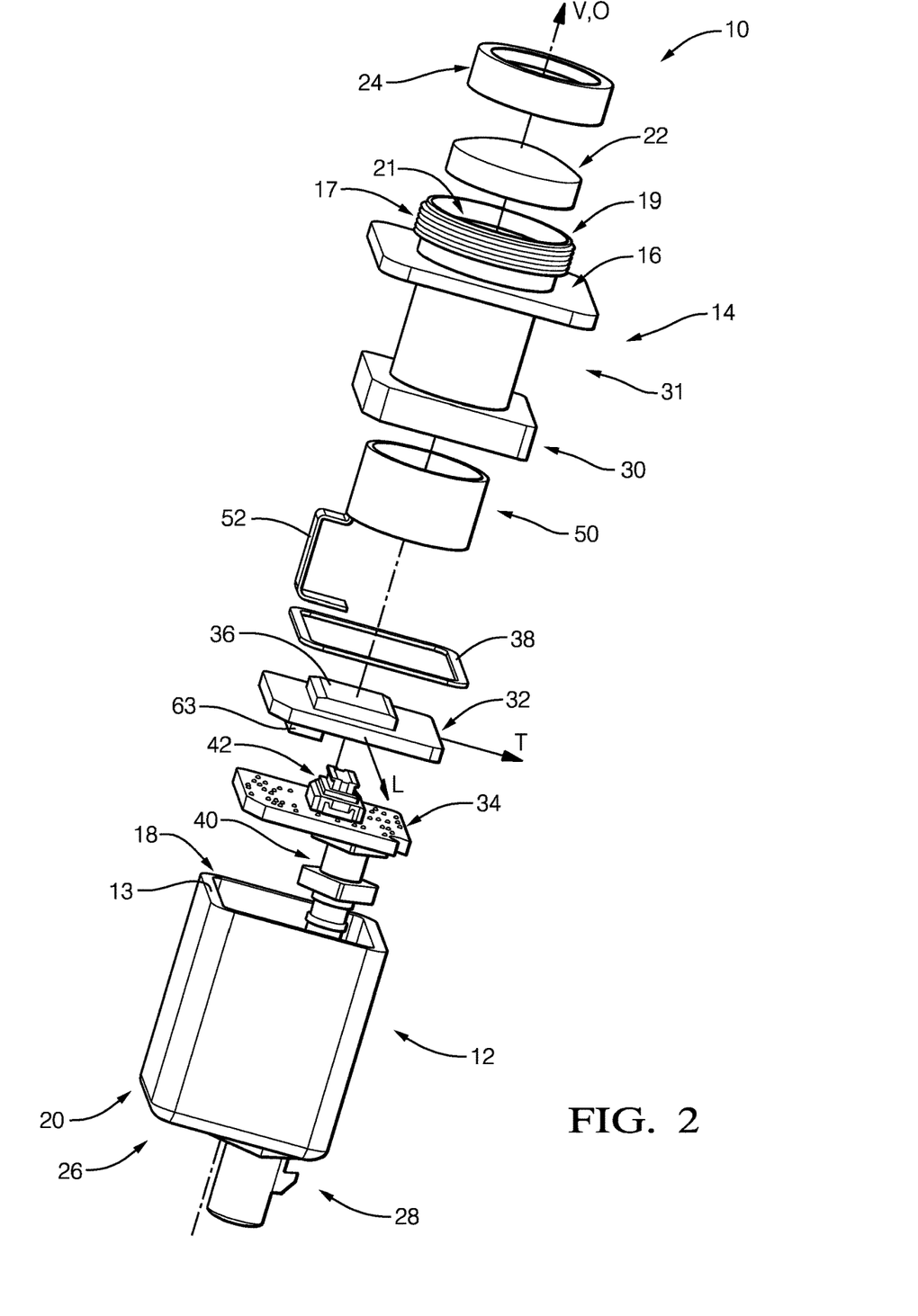
FIG. 2 is a schematic perspective exploded view of the optical device of FIG. 1.

According to FIG. 1 and FIG. 2, an optical device 10, more particularly a camera for a vehicle is represented. This type of camera is provided to be mounted on the exterior of the vehicle and therefore to undergo the external conditions to the vehicle such as the climate.

According to FIG. 1, the optical device 10 comprises a protective casing 12 comprising a wall 15 of generally cylindrical shape extending along the vertical axis V from its top end 18 to its bottom end 20. The bottom end 20 of the protective casing 12 is closed by a casing bottom 26. The casing bottom 26 comprises a connector body 28 extending vertically outwardly of the protective casing 12, the connector body 28 being formed integrally with the casing bottom 26.

The optical device 10 comprises a lens holder 14 extending vertically in the protective casing 12. The lens holder 14 is an open hollow structure forming a cavity 21 extending from its top end 19 arranged outside the protective casing 12 up to its bottom end 30 inserted in the protective casing 12. The top end 19 of the lens holder 14 includes an optical lens 22 aligned along the optical axis O of the optical device 10.

The lens holder 14 is held in abutment against the top end 18 of the protective casing 12. The lens holder 14 therefore comprises a bearing plate 16 arranged in abutment against the top end 18 of the protective casing 12. The lens holder 14 is fixed by bearing against the top end 18 of the protective casing 12 by means of a first adhesive seal 13 so as to hermetically seal the protective casing 12. The bearing plate 16 comprises a circular aperture opening onto the cavity 21 of the lens holder 14 and including an upper wall 17 to the protective casing 12 extending vertically up to the top end 19 of the lens holder 14. The optical lens 22 is arranged against the inner surface of the upper wall 17 and is kept aligned along the optical axis O of the optical device 10 by a holding cap 24 fixed on the upper wall 17.

According to FIG. 2, the lens holder 14 comprises the upper wall 17 arranged above the bearing plate 16 and comprises a lower wall 31 to the protective casing 12 extending vertically from the bearing plate 16 to its bottom end 30. The bottom end 30 forms a base of generally parallelepiped shape.

The optical device 10 comprises a first rigid printed circuit board 32.

The first rigid printed circuit board 32 is of generally rectangular shape. The first printed circuit board 32 comprises, on its upper face, an electronic image-capture circuit 36 aligned with the optical lens 22 along the optical axis O of the optical device 10. The printed circuit board 32 is provided to be fixed on the bottom end 30 of the lens holder 14 by means of a second adhesive seal 38, so as to hermetically seal the cavity 21 of the lens holder 14.

The optical device 10 comprises a second rigid printed circuit board 34.

The second rigid printed circuit board 34 comprises, on its lower face, electrical terminals 40 extending vertically and provided to be inserted into the body of the connector 28. The second printed circuit board 34 is therefore provided to be arranged at the bottom of the casing 26 so that its electrical terminals 40 can be inserted into the body of the connector 28.

The second printed circuit board 34 includes means 42 of electrical connection with the first printed circuit board 32. The second printed circuit board 34 may comprise electronic image-processing components received from the electronic image-capture circuit 36.

The optical device 10 comprises a flexible heater band 50. The heater band 50 is configured to be arranged around the lower wall 31 of the lens holder 14. According to the represented embodiment, and not exclusively, the lower wall 31 of the lens holder 14 is an annular cylindrical wall. More particularly, the heater band 50 is configured to be wound around the annular lower wall 31 of the lens holder 14 so as to be in contact with the annular wall 31 all around it. The heater band 50 also comprises an electrical connection interface 52 provided to be electrically connected to one of the two rigid printed circuit boards 32, 34 of the optical device. In a non-limiting manner, according to this embodiment, the electrical connection interface 52 is provided to be electrically connected to the first rigid printed circuit board 32 by means of an electrical connector 63 arranged on the lower face of the first printed circuit board 32. This choice makes it possible to limit the dimension, more precisely the length, of the electrical connection interface 52.

Figure 3:
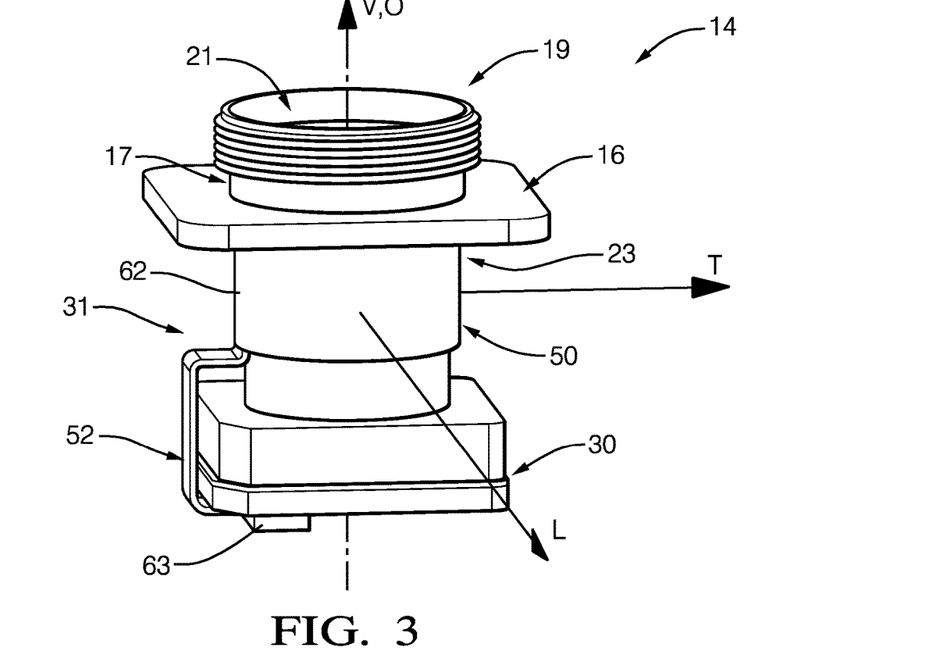
FIG. 3 is a first partial schematic perspective view in cross section of the optical device of FIG. 1 illustrating the heater band arranged on the lens holder.

According to FIG. 3, the heater band 50 is arranged around the lower wall 31 of the lens holder 14. The heater band 50 is arranged so as to cover the top end 23 of the lower wall 31 of the lens holder 14 so as to be as close as possible to the upper wall of the lens holder 14 provided to receive the optical lens 22. The heater band 50 comprises electrical conductors 62 configured to be traversed by an electric current coming from the first printed circuit board 32.

In a non-exclusive manner, the heater band 50 may be a flexible printed circuit board connected by the electrical connection interface 52 to the first printed circuit board 32. The electrical connection interface 52 may be a connection tab formed integrally with the heater band 50. In other word, the heater band 50 and the associated electrical connection interface 52 may be one and the same T-shaped flexible printed circuit board prior to its assembly on the lower wall 31 of the lens holder 14. The portion representing the base of the 'T' forms the electrical connection interface 52 of the heater band, the head of the 'T' forming the flexible heater band 50 configured to be arranged around the lower wall 31 of the lens holder 14.

In a particular embodiment and so as to overcome the electrical connector 63 arranged on the lower face of the first printed circuit board 32, the electrical connection interface 52 is a thinned portion of the substrate of the first printed circuit board 32.

In another embodiment, the heater band 50, the electrical connection interface 52 and the first printed circuit board 32 may be one and the same printed circuit board of the flex-rigid printed circuit board type (not shown), i.e., a single printed circuit board comprising a flexible portion including the flexible heater band 50 and including the flexible tab forming the electrical connection interface 52, said flexible portion being in substrate continuity of the rigid main portion.

Figure 4:
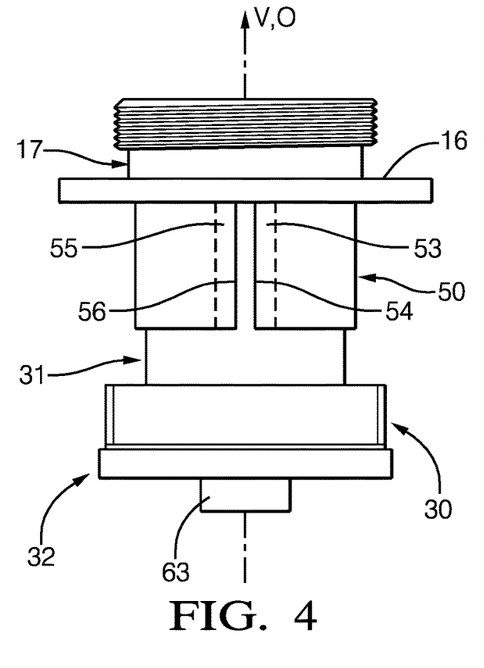
FIG. 4 is a partial schematic perspective view in cross section of the optical device of FIG. 1 illustrating a first embodiment of attachment means of the heater band arranged on the lens holder.

According to FIG. 4, the two longitudinal ends 54, 56 opposite the heater band are fixed on the lower wall 31 of the lens holder 14. According to FIG. 4, the two longitudinal ends 54, 56 include each an adhesive band 53, 55 of the pressure-sensitive adhesive type so as to be bonded to the lower wall 31 of the lens holder 14.

Figure 5:
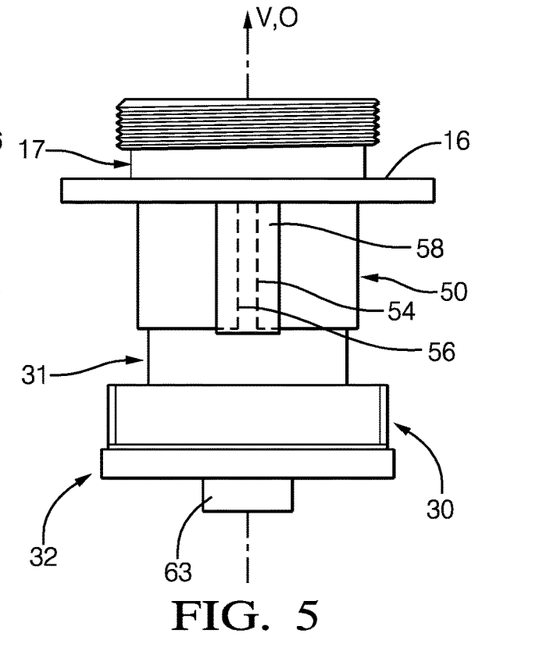
FIG. 5 is another partial schematic perspective view in cross section of the optical device of FIG. 1 illustrating a second embodiment of attachment means of the heater band arranged on the lens holder.

According to FIG. 5, other attachment means 58 of the heater band 50 are arranged on the longitudinal ends 54, 56 of the heater band 50. The attachment means 58 may comprise an elastic portion so as to fit to the profile of the wall 31 of the lens holder, the elastic attachment means allowing to compress the heater band 50 against the lower wall 31 of the lens holder 14. Alternatively, a clamping ring can also be inserted around the heater band 50 in order to pinch the heater band 50 between the clamping ring and the lower wall 31 of the lens holder 14.

According to FIGS. 6, 7, 8 and 9, four steps of assembling the optical device 10 described through FIGS. 1 to 5 are illustrated.

Figure 6:
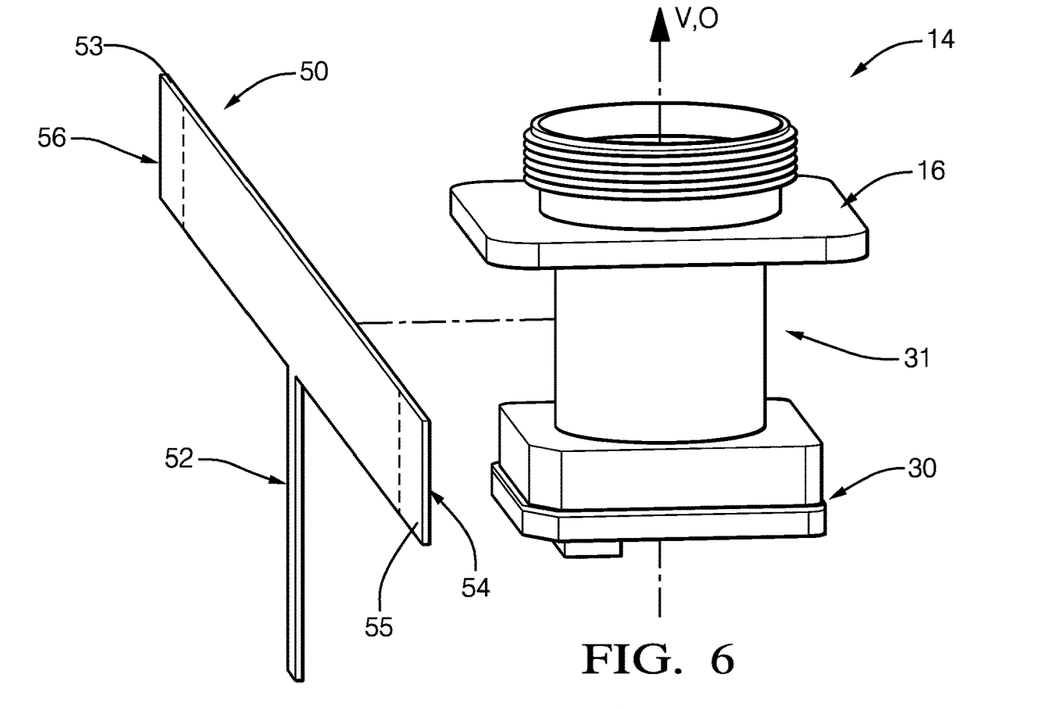
FIGS. 6, 7, 8 and 9 are schematic perspective views of four steps of assembling the heating device on the lens holder the optical device according to the invention.

According to FIG. 6, a first step consists in providing the first rigid printed circuit board 32 comprising the electronic image-capture component 36 arranged on the lens holder 14 and aligned along the optical axis O of the device 10. In addition to providing the lens holder 14 pre-assembled with the first printed circuit board 32, this first step comprises providing the flexible heater band 50 including the electrical connection interface 52 and also the attachment means 58, in particular the two adhesive bands 53, 55 each arranged on a longitudinal end 54, 56 of the heater band. It should be noted that the heater band 50 is presented facing the lens holder 14 in a planar manner, therefore not curved.

Figure 7:
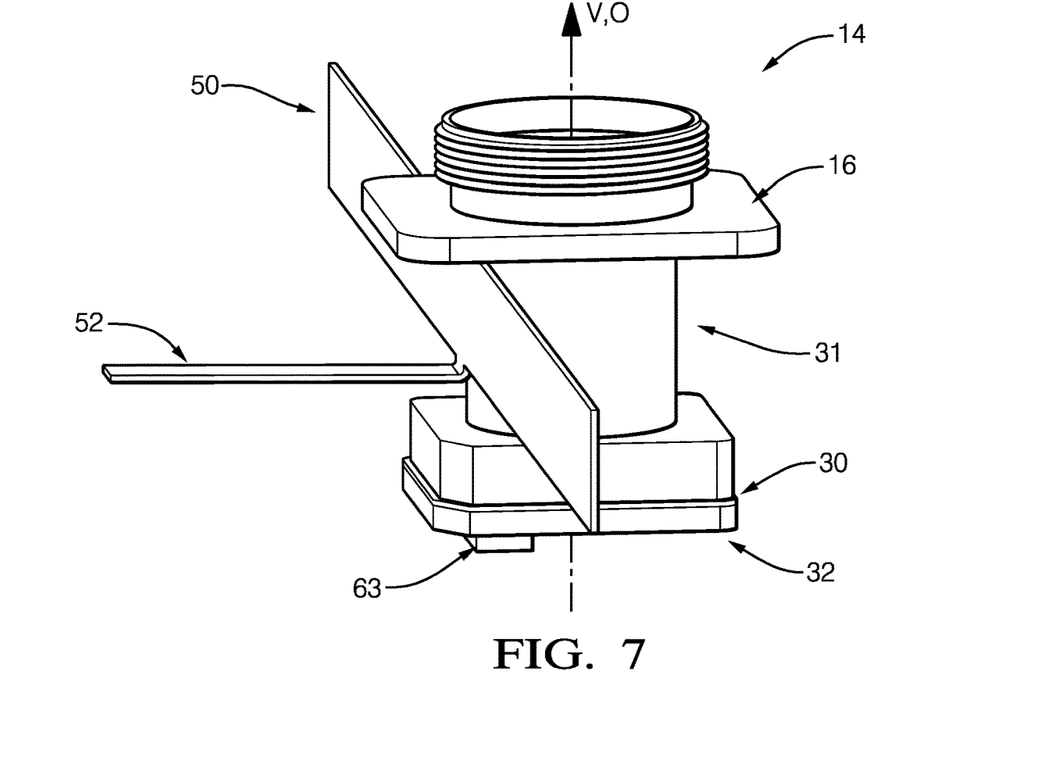

According to FIG. 7, a second step consists in pressing the flexible heater band 50 in planar configuration against the lower wall 31 of the lens holder 14. More particularly, one of the two vertical ends of the heater band 50 is arranged as close as possible to, even in contact with, the bearing plate 16 of the lens holder 14.

Figure 8:
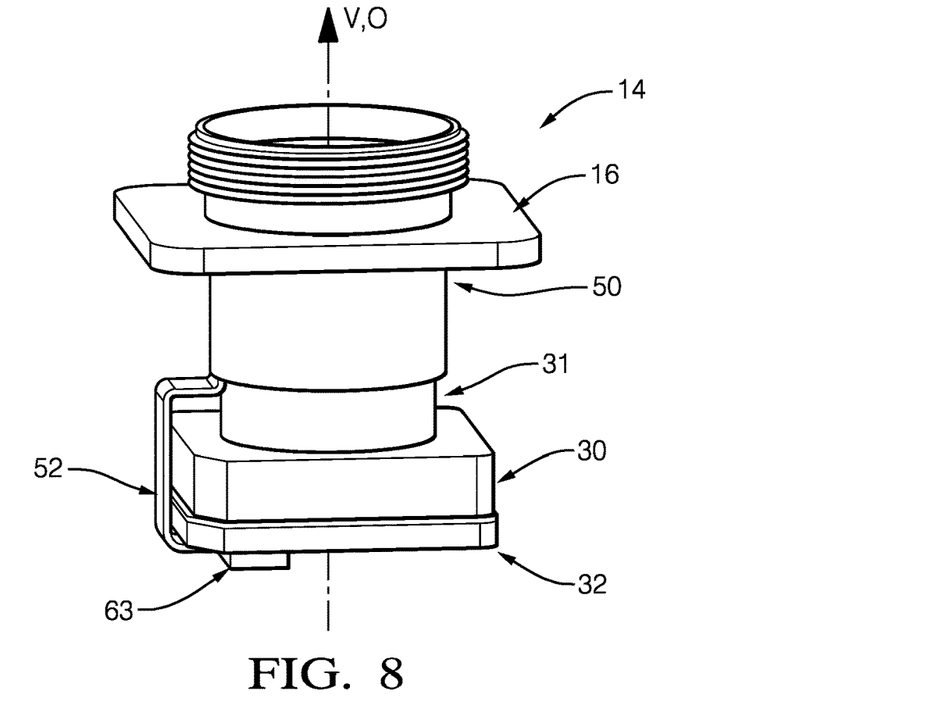

According to FIG. 8, a third step consists in arranging the heater band 50 all around and in contact with the lower wall 31 of the lens holder 14. This step is completed by an action of holding the heater band 50 against the lower wall 31 of the lens holder 14 via the attachment means 58 of the heater band 50. More particularly, a specific pressure exerted on the longitudinal ends 54, 56 allows the adhesion of the two adhesive bands 53, 55 to the lower wall 31 of the lens holder 14.

Figure 9:
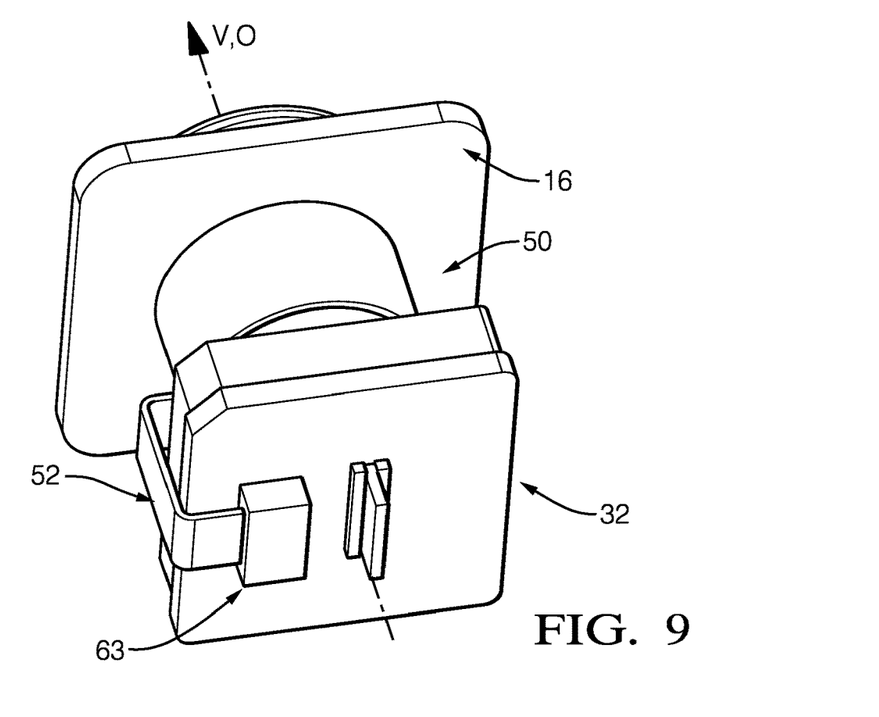

Finally, according to FIG. 9, a step of connecting the electrical connection interface 52 to the first printed circuit board is carried out by insertion of the electrical connection interface 52, that is to say from the free end of the electrical connection tab, in the electrical connector 63 arranged on the lower face of the first rigid printed circuit board 32.

The step of providing the rigid printed circuit board 32, the step of providing the heater band 50 and the step of electrically connecting the electrical connection interface 52 to the first rigid printed circuit board 32 are substituted by a single step of providing a single printed circuit board comprising a rigid main printed circuit board including the electronic image-capture component 36, and comprising a flexible printed circuit board including the flexible heater band 50 and including an extension forming the electrical connection interface 52, said flexible printed circuit board being in substrate continuity of the rigid main portion.

The invention is not limited to an electrical connection of the electrical connection interface 52 by means of an electrical connector 63. Any other type of fixing, for example by welding, may be suitable for the invention.

The invention is also not limited to the electrical connection of the electrical connection interface 52 to the first rigid printed circuit board 32 comprising the electronic image-capture component 36, but to any other rigid printed circuit board of the optical device, such as the second rigid printed circuit board of the embodiment represented in FIGS. 1 to 5.

While this invention has been described in terms of the preferred embodiments thereof, it is not intended to be so limited, but rather only to the extent set forth in the claims that follow.

We claim:

1. An optical device comprising:
   a single flex-rigid printed circuit board comprising:
      a rigid printed circuit board portion including an electronic image-capture circuit; and
      a flexible printed circuit board portion comprising:
         a flexible heater band; and
         a flexible connection interface tab arranged between the rigid circuit board portion and the flexible heater band, wherein the rigid printed circuit board portion and the flexible circuit board are formed as one inseparable printed circuit board such that the rigid printed circuit board portion and the flexible printed circuit board portion have substrate continuity; and
   a lens holder comprising:
      at least one optical lens;

a wall forming a cavity extending along an optical axis of the device from a top end to a bottom end, the bottom end being mounted on the rigid printed circuit board portion so as to align, along the optical axis of the device, the electronic image-capture circuit and the optical lens, the flexible heater band arranged in contact with the wall of the lens holder and compressed around the wall of the lens holder.

2. The optical device according to claim 1, wherein the flexible heater band comprises two longitudinal ends configured to hold the flexible heater band clamped against the wall of the lens holder.

3. The optical device according to claim 2, wherein each of the two longitudinal ends includes an adhesive band.

4. The optical device according to claim 1, wherein the flexible heater band comprises an elastic portion so as to fit to a profile of the wall of the lens holder.

5. The optical device according to claim 1, wherein the flexible heater band comprises electrical conductors configured to be traversed by an electric current coming from the rigid printed circuit board portion.

6. The optical device according to claim 1, wherein the wall comprises:
a lower wall adjacent to the bottom end; and
an upper wall adjacent to the top end.

7. The optical device according to claim 6, wherein the lower wall is an annular cylindrical wall.

8. The optical device according to claim 6, wherein the flexible heater band is configured to be arranged around the lower wall.

9. The optical device according to claim 8, wherein the flexible heater band is arranged to cover a top end of the lower wall that is adjacent to the upper wall.

10. The optical device according to claim 6, wherein a clamping ring is inserted around the flexible heater band, the clamping ring configured to pinch the flexible heating band between the clamping ring and the lower wall.

11. The optical device according to claim 1, wherein
the lens holder further comprises a bearing plate; and
the flexible heater band is arranged in contact with the bearing plate.

12. The optical device according to claim 1, wherein the optical device is mounted to an exterior of a vehicle.

13. A method for assembling an optical device comprising:
providing a lens holder including at least one optical lens and comprising a wall forming a cavity extending along an optical axis of the device;
providing a single flex-rigid printed circuit board comprising:
a rigid printed circuit board portion comprising an electronic image-capture circuit;
a flexible printed circuit board portion comprising:
a flexible heater band arranged around the wall of the lens holder; and
an extension forming an electrical connection interface, the extension, wherein the rigid printed circuit board portion and the flexible circuit board are formed as one inseparable printed circuit board such that the rigid printed circuit board portion and the flexible printed circuit board portion have substrate continuity; and
arranging the rigid printed circuit board on the lens holder so as to be able to align, along the optical axis of the device, the electronic image-capture circuit and the optical lens;
compressing the flexible heater band against the wall of the lens holder.

14. The method according to claim 13, wherein the wall of the lens holder comprises:
a lower wall; and
an upper wall, and wherein arranging the heater band around the wall of the lens holder comprises arranging the heater band around the lower wall.

15. The method according to claim 13, wherein compressing the flexible heater band against the wall of the lens holder comprises configuring two longitudinal ends of the flexible heater band to hold the flexible heater band clamped against the wall of the lens holder.

16. The method according to claim 15, wherein compressing the flexible heater band against the wall of the lens holder comprises using an elastic portion of the two longitudinal ends so as to fit to a profile of the wall of the lens holder.

17. The method according to claim 15, wherein each of the two longitudinal ends includes an adhesive band.

18. The method according to claim 13, wherein arranging the rigid printed circuit board on the lens holder comprises:
mounting a bottom end of the wall to the rigid printed circuit board; and
arranging the optical lens at a top end of the wall; and
wherein the wall comprises:
a lower wall adjacent to the bottom end; and
an upper wall adjacent to the top end.

19. The method according to claim 18, wherein compressing the flexible heater band against the wall of the lens holder comprises inserting a clamping ring around the flexible heater band, the clamping ring configured to pinch the flexible heating band between the clamping ring and the lower wall.

20. The method according to claim 13, wherein the flexible heater band comprises electrical conductors configured to be traversed by an electric current coming from the rigid printed circuit board.

* * * * *